(12) United States Patent
Mihlbauer et al.

(10) Patent No.: US 7,594,998 B2
(45) Date of Patent: Sep. 29, 2009

(54) AQUARIUM FILTER ASSEMBLY AND FILTER ELEMENT

(75) Inventors: Brad L. Mihlbauer, Mukwonago, WI (US); David R. Troop, II, Kenosha, WI (US); Lonnie Austin Ready, West Columbia, SC (US); Giacomo Guoli, Milan (IT); Fabio Bellia, Trebaseleghe (IT)

(73) Assignee: Newa Tecno Industria s.r.l. (IT)

( * ) Notice: Subject to any disclaimer, the term of this patent is extended or adjusted under 35 U.S.C. 154(b) by 0 days.

(21) Appl. No.: 12/268,096

(22) Filed: Nov. 10, 2008

(65) Prior Publication Data

US 2009/0071886 A1   Mar. 19, 2009

Related U.S. Application Data

(62) Division of application No. 11/696,759, filed on Apr. 5, 2007.

(60) Provisional application No. 60/791,830, filed on Apr. 13, 2006.

(51) Int. Cl.
*B01D 27/02* (2006.01)
*A01K 63/04* (2006.01)

(52) U.S. Cl. ............ 210/167.27; 210/232; 119/259

(58) Field of Classification Search ........ 210/150, 210/151, 167.21, 167.22, 167.27, 232, 416.1, 210/416.2; 119/259, 260
See application file for complete search history.

(56) References Cited

U.S. PATENT DOCUMENTS

| | | | |
|---|---|---|---|
| 2,275,428 A | 3/1942 | Haldeman | |
| 2,665,250 A | 1/1954 | Willinger et al. | |
| 3,511,376 A | 5/1970 | Sesholtz | |
| 3,540,591 A | 11/1970 | Yamazaki | |
| 3,566,840 A | 3/1971 | Willinger | |
| 3,669,297 A | 6/1972 | Willinger | |
| 3,717,253 A | 2/1973 | Lovitz | |
| 3,738,494 A | 6/1973 | Willinger et al. | |
| 4,093,547 A | 6/1978 | Sherman et al. | |
| 4,345,997 A | 8/1982 | McConnell, Jr. | |
| 4,735,715 A | 4/1988 | Willinger | |
| 4,761,227 A | 8/1988 | Willinger et al. | |
| 4,768,423 A * | 9/1988 | Boeger | 454/146 |
| 4,842,727 A | 6/1989 | Willinger et al. | |

(Continued)

FOREIGN PATENT DOCUMENTS

GB    2 248 558 A    4/1992

(Continued)

OTHER PUBLICATIONS

Eclipse Aquarium Systems, Owner's Manual, System 3, System Six, System Twelve, Marineland Aquarium Products, Oct. 2000.

(Continued)

*Primary Examiner*—Fred Prince
(74) *Attorney, Agent, or Firm*—Andrus, Sceales, Starke & Sawall, LLP

(57) ABSTRACT

An aquarium filter assembly includes a housing having a filter cartridge and a water pump and defining a flow path therethrough from upstream to downstream from an inlet to an outlet. A replaceable filter element is mounted in one or more designated orientation positions.

12 Claims, 5 Drawing Sheets

U.S. PATENT DOCUMENTS

| | | | |
|---|---|---|---|
| 4,880,549 | A | 11/1989 | Willinger et al. |
| 4,997,559 | A | 3/1991 | Ellis et al. |
| 5,053,125 | A | 10/1991 | Willinger et al. |
| 5,160,607 | A | 11/1992 | Thiemer et al. |
| 5,176,824 | A | 1/1993 | Willinger et al. |
| 5,228,986 | A | 7/1993 | Ellis et al. |
| 5,266,190 | A | 11/1993 | Tominaga |
| D353,649 | S | 12/1994 | Willinger et al. |
| 5,397,463 | A | 3/1995 | Woltmann |
| 5,423,978 | A | 6/1995 | Snyder et al. |
| 5,460,722 | A | 10/1995 | Chen |
| 5,522,987 | A | 6/1996 | Bresolin |
| 5,567,315 | A | 10/1996 | Weidenmann et al. |
| 5,571,409 | A | 11/1996 | Scarborough |
| 5,728,293 | A | 3/1998 | Guoli et al. |
| 5,800,702 | A * | 9/1998 | Taylor-McCune et al. ... 210/162 |
| D460,996 | S | 7/2002 | Carley et al. |
| D462,739 | S | 9/2002 | Carley et al. |
| D468,393 | S | 1/2003 | Agresta et al. |
| 6,692,637 | B2 | 2/2004 | Fox et al. |
| 6,706,176 | B1 | 3/2004 | Goldman |
| D494,251 | S | 8/2004 | Fox, Jr. et al. |
| 6,797,163 | B2 | 9/2004 | Carley et al. |
| 6,866,773 | B2 | 3/2005 | Margovsky et al. |
| 7,033,491 | B2 | 4/2006 | Chang |
| 7,429,321 | B2 | 9/2008 | Willinger |
| 2004/0238426 | A9 | 12/2004 | Fox et al. |
| 2005/0284397 | A1 | 12/2005 | Carley et al. |
| 2006/0000755 | A1 | 1/2006 | Carley et al. |

FOREIGN PATENT DOCUMENTS

| | | |
|---|---|---|
| JP | 61-230786 A | 10/1986 |
| JP | 10-80611 A | 3/1996 |
| JP | 2006-149221 A | 6/2006 |

OTHER PUBLICATIONS

Eclipse—The Filtration & Illumination System, Owner's Manual, Eclipse1, Eclipse 2, Eclipse3, Marineland Aquarium Products, Mar. 2000.

* cited by examiner

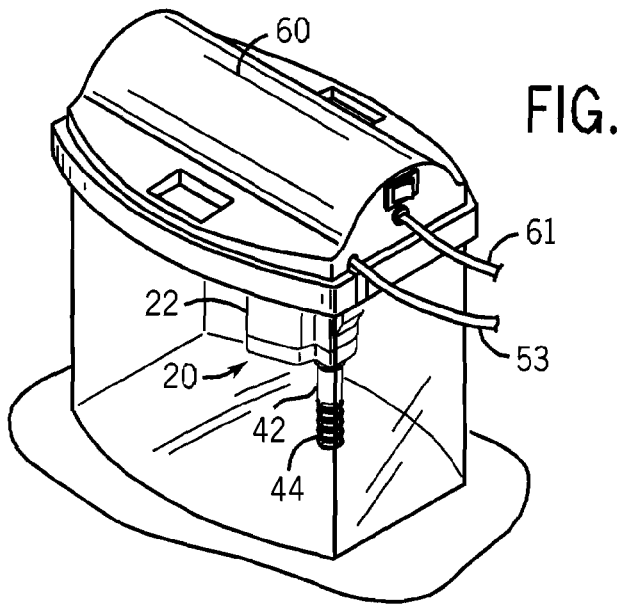
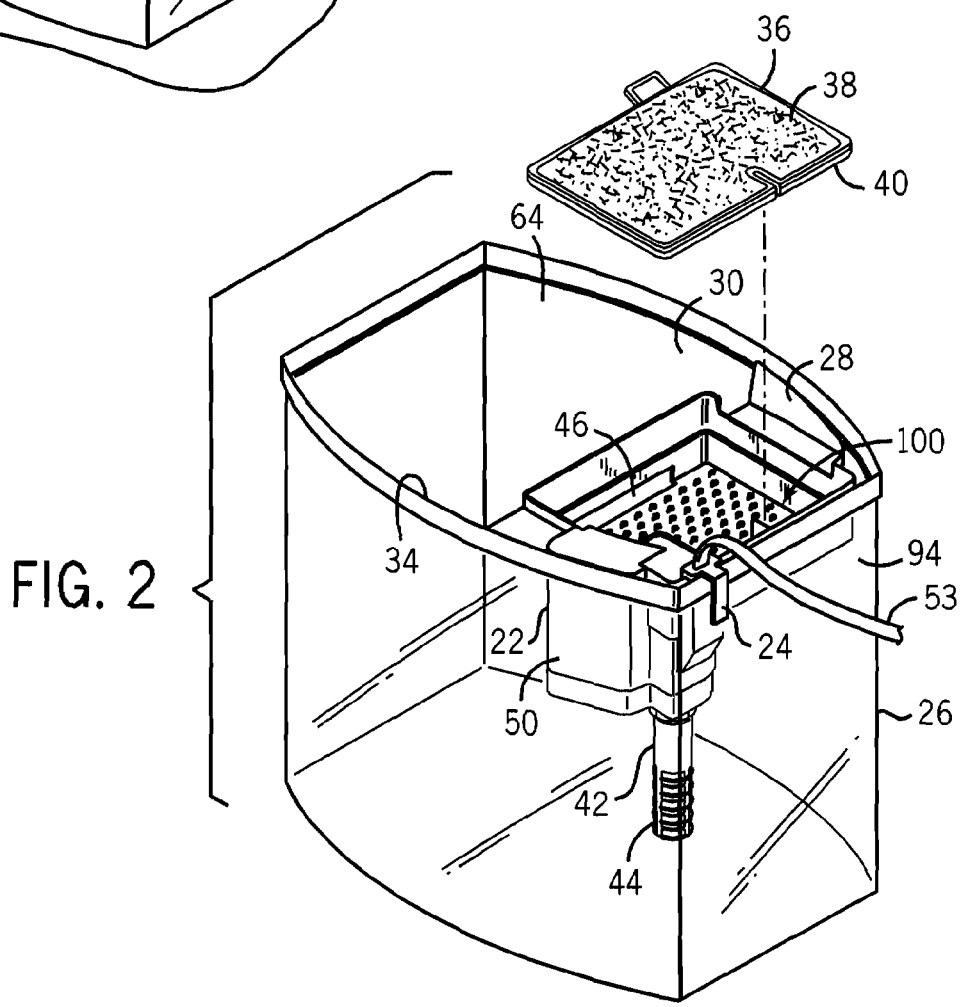

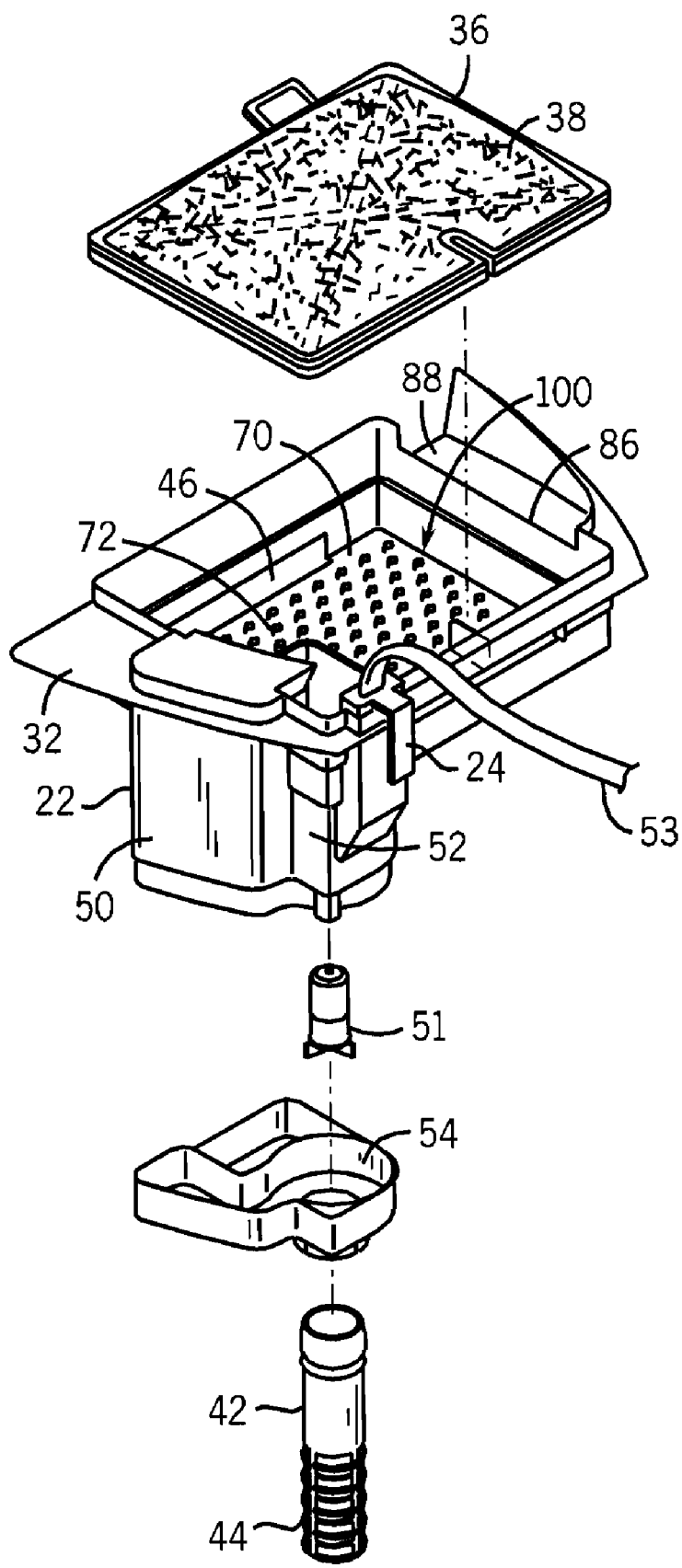

AQUARIUM FILTER ASSEMBLY AND FILTER ELEMENT

CROSS-REFERENCE TO RELATED APPLICATIONS

This application is a divisional of U.S. Ser. No. 11/696,759, filed Apr. 5, 2007, pending, which application claims the benefit of and priority from Provisional U.S. Patent Application No. 60/791,830, filed Apr. 13, 2006.

BACKGROUND AND SUMMARY

The invention relates to aquarium filters and assemblies.

Aquarium filters and assemblies are known in the prior art. The present invention arose during continuing development efforts directed toward improved product construction, performance and features.

BRIEF DESCRIPTION OF THE DRAWINGS

FIG. 1 is a perspective view of an aquarium filter assembly mounted to an aquarium tank.

FIG. 2 is a partially exploded perspective view of the filter assembly of claim 1, with the aquarium cover removed.

FIG. 3 is an exploded perspective view of the aquarium filter assembly of FIG. 2.

DETAILED DESCRIPTION

Figure 8:
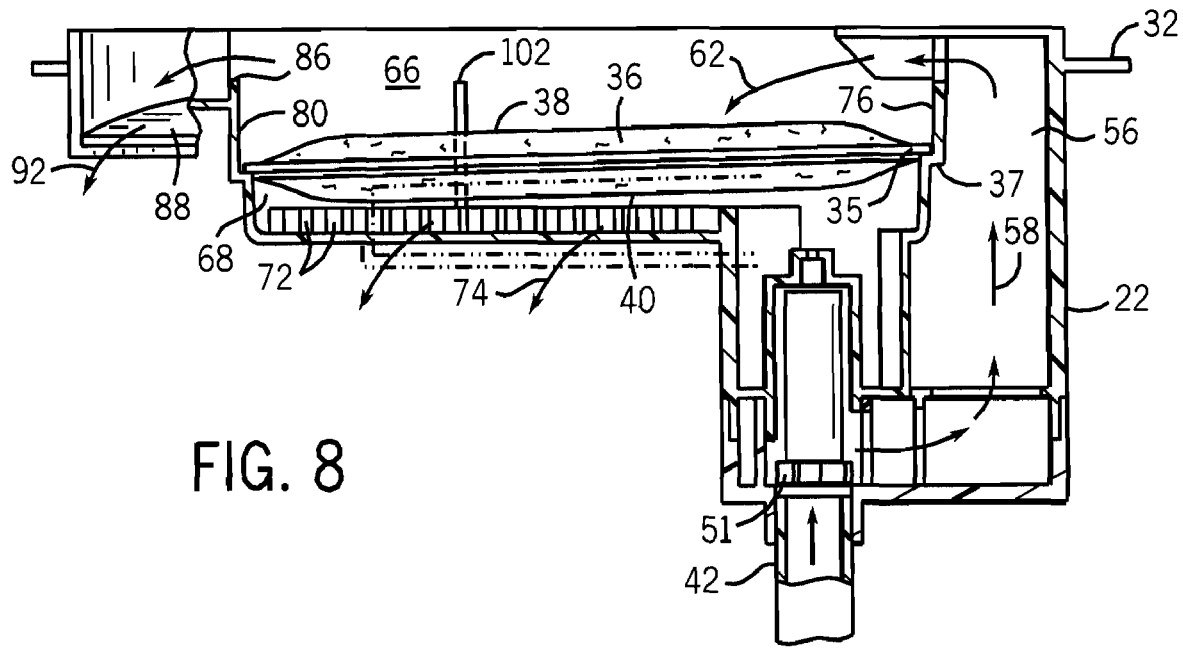
FIG. 8 is a sectional view taken along line 8-8 of FIG. 6.

FIG. 1 shows an aquarium filter assembly 20 including a housing 22 having mounting structure 24, FIG. 2, for mounting to an aquarium tank 26. The mounting structure may include a clip at 24 and a dimensional fit of upstanding flange 28 against tank sidewall 30 to prevent tipping of the housing 22 and/or may include a horizontal flange 32, FIG. 3, extending around the perimeter of the housing and resting on the top 34 of the tank sidewalls, or any other suitable mounting structure. Housing 22 has a filter cartridge 36 therein. The filter cartridge has an upstream face 38, FIGS. 2-9, and a downstream face 40. The housing has an inlet 42 receiving dirty aquarium water through grate or screen 44, and has an outlet 46 returning clean filtered water to tank 26. The housing defines a water flow path therethrough from upstream to downstream from inlet 42 to outlet 46, including a vertical flow path portion 48, FIG. 6, from upstream face 38 of the filter cartridge to downstream face 40 of the filter cartridge. A water pump 50 in the housing is at least partially submerged in the water in the tank and pumps water along the noted flow path by means impeller 51 driven by electric motor 52 connected to a source of electrical power by power cord 53 to pump water from pumping chamber 54 upwardly through channel 56 as shown at arrow 58, FIG. 8, to pump the water along the noted flow path through the housing. The aquarium is closed by a cover 60 resting on the top 34 of tank 26 and having electrical power cord 53 extending therethrough for supplying electrical power to pump 50, and an electrical cord 61 extending therethrough for supplying electrical power to a light in the cover, as is known. Water pump 50 is upstream of filter cartridge 36 and pumps water from housing inlet 42 upwardly as shown at arrow 58, FIGS. 4, 8, and then laterally as shown at arrow 62 to upstream face 38 of filter cartridge 36. Water then flows by gravity along the noted vertical flow path portion 48 from upstream face 38 of the filter cartridge to downstream face 40 of the filter cartridge.

The filter cartridge 36 is provided by a replaceable filter element having a height and a width spanning along an extension plane, and a thickness substantially less than the height and the width and spanning perpendicularly to such extension plane, wherein such extension plane lies in a substantially horizontal plane. Replaceable filter element 36 is directly above the aquarium water in tank 26. The tank has an interior 64 holding aquarium water therein, and both the filter cartridge 36 and the water pump 50 are in tank interior 64.

Figure 6:
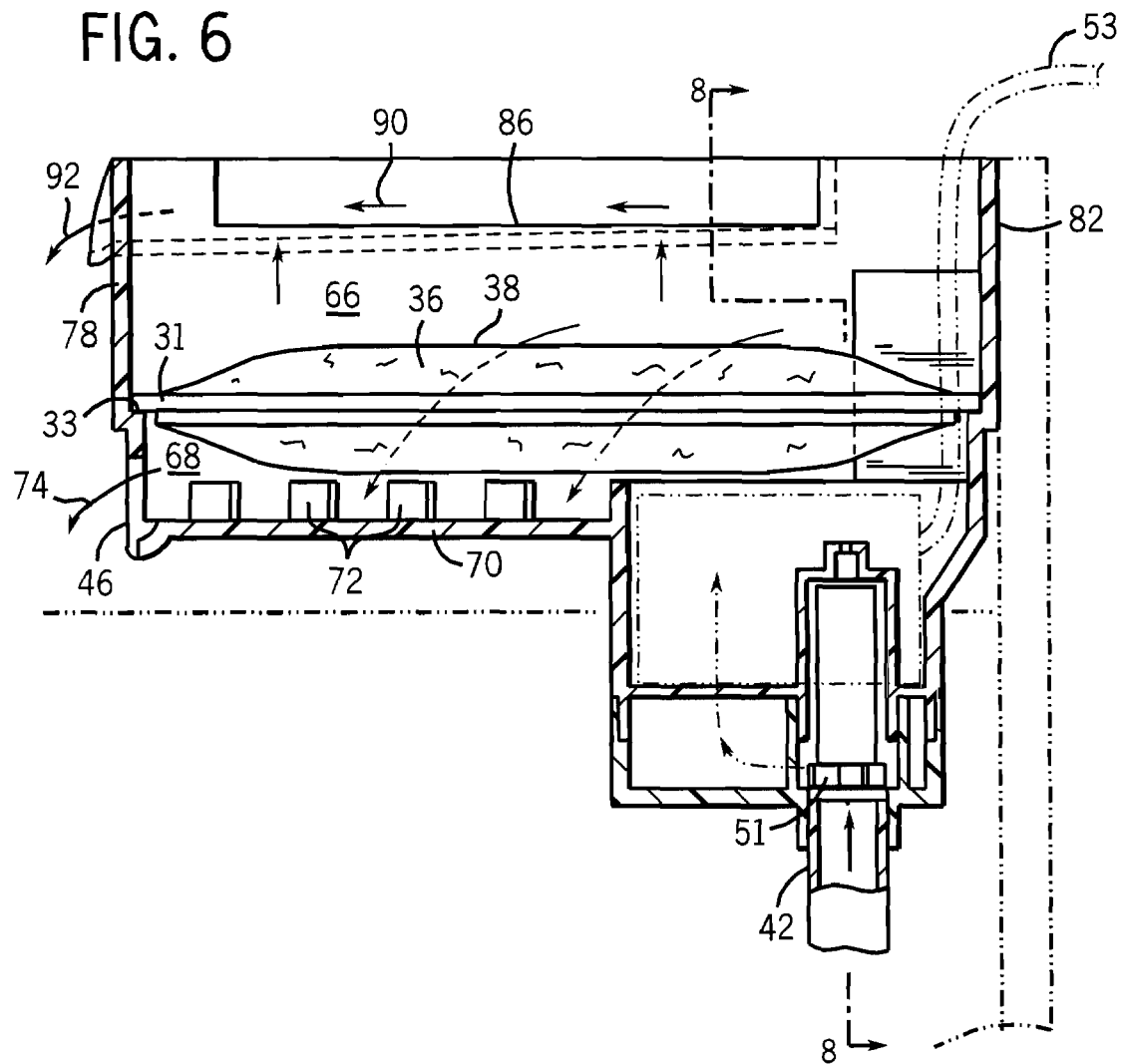
FIG. 6 is a sectional view taken along line 6-6 of FIG. 4.
Figure 7:
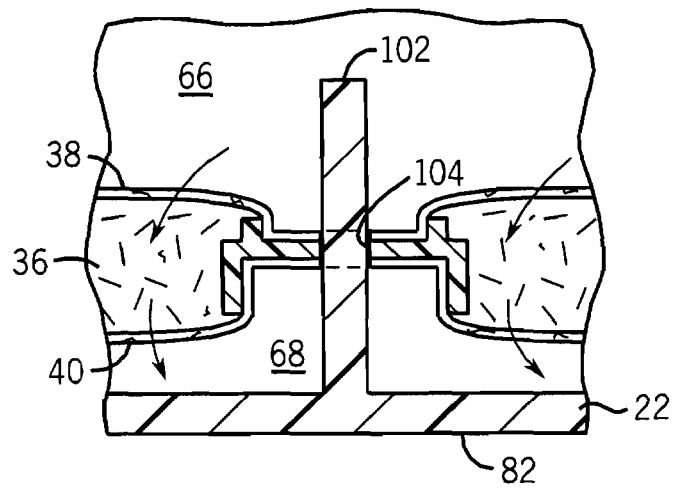
FIG. 7 is a sectional view taken along line 7-7 of FIG. 5.

Housing 22 has upper and lower horizontally spanning plenums 66 and 68, FIG. 6, vertically spaced from each other by filter cartridge 36 therebetween and vertically spaced directly above the aquarium water in tank 26. Housing 22 has a bottom wall 70 with a plurality of biological reactant surface area protrusions 72, FIGS. 3, 6, 8, protruding upwardly therefrom and on which filter cartridge 36 rests, when the filter cartridge is saturated with water, and above which the downstream face 40 of the filter cartridge is slightly spaced prior to such saturation, FIG. 6. The filter cartridge is supported in the housing at filter cartridge border frame 31 resting on shoulders or ledges 33 of the housing sidewalls. One side of the filter cartridge, right side at 35 in FIG. 8, rests on slightly raised shoulder or ledge 37 of housing sidewall 76, such that the filter cartridge extends along a slight downward angle or slope, preferably less than about 10° relative to horizontal, to provide a slight downhill path for water flow from right to left as viewed in FIG. 8. Protrusions 72 space filter cartridge 36 at downstream bottom face 40 above bottom wall 70 of the housing, such that outlet plenum 68 is provided between downstream bottom face 40 of the filter element and bottom wall 70 of the housing. Protrusions 72 also provide biological filtration, namely providing surface area to collect beneficial bacteria to eliminate toxic ammonia and nitrites, as is known, in addition to the mechanical filtration provided by filter element 36 filtering particles and debris, and if desired, providing chemical filtration containing activated carbon to remove toxic impurities, odors and discoloration. After passing downwardly through filter element 36, and around and along protrusions 72, the water flows out of lower plenum 68 at outlet 46 as shown at arrow 74 to return to the tank.

Figure 4:
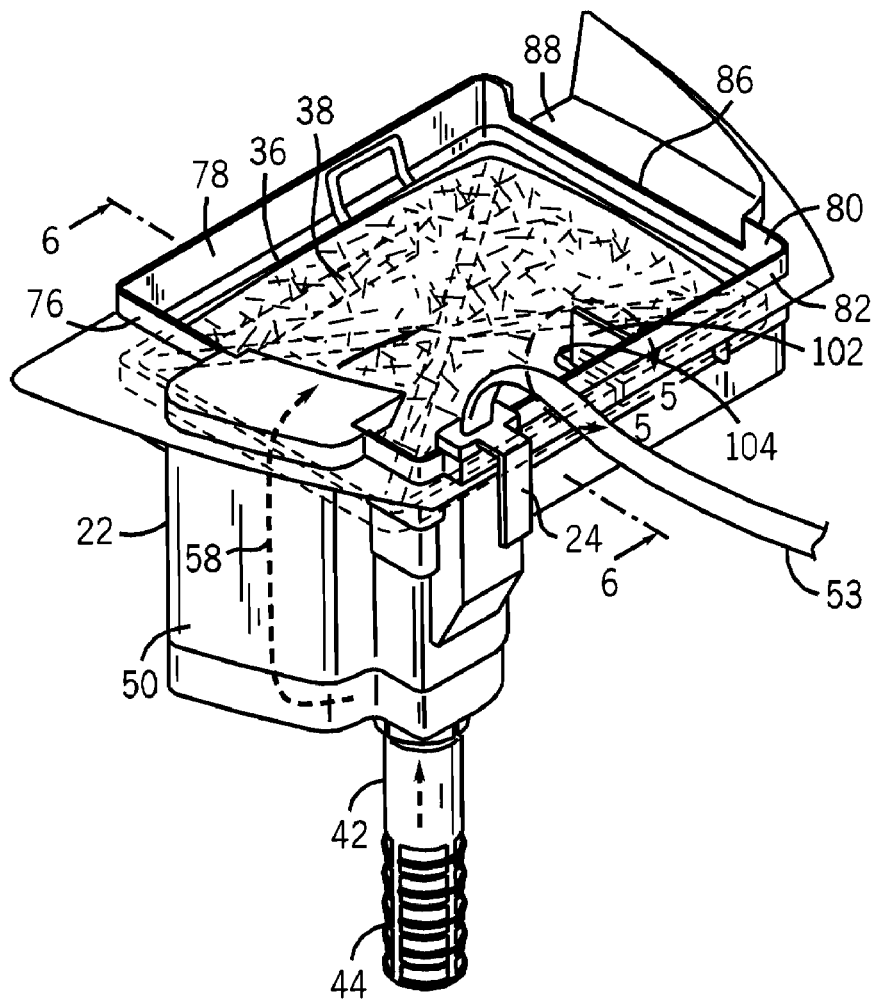
FIG. 4 is a perspective assembly view of the aquarium filter assembly of FIG. 3.
Figure 5:
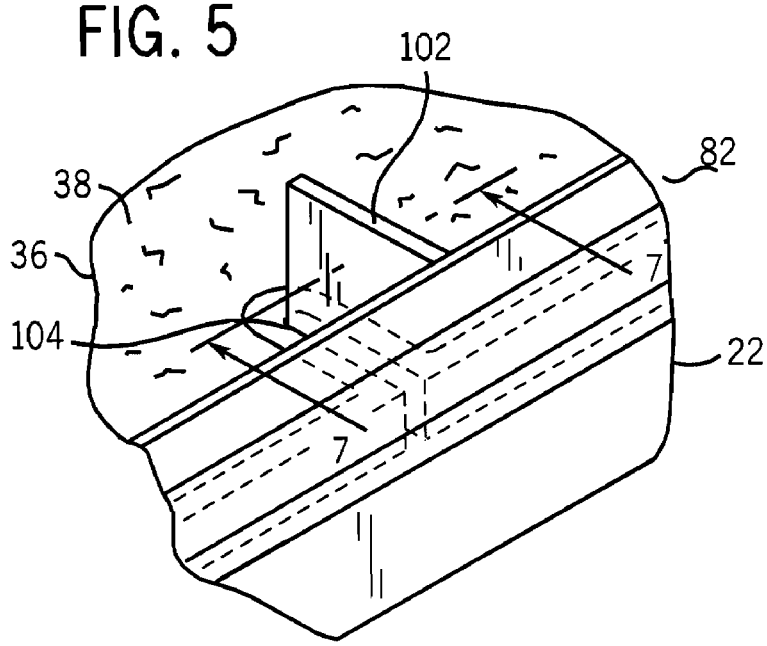
FIG. 5 is an enlarged view of a portion of FIG. 4 at line 5-5.

Housing 22 has first, second, third, and fourth vertically extending sidewalls 76, 78, 80, 82, FIG. 4, bordering the upper and lower horizontally spanning plenums 66 and 68 therebetween. First sidewall 76 has water flow passage 56 passing water upwardly therealong from inlet 42 and pump 50 to upper plenum 66. Second sidewall 78 has the noted outlet 46 and passes water through outlet 46 from lower plenum 68 to return water to tank 26. Third sidewall 80 has an overflow port 86, FIG. 4, passing water from upper plenum 66 into overflow channel or trough 88 as shown at arrow 90, FIG. 9, to return such overflow water back to the tank as shown at arrow 92, e.g. in response to a clogged filter element 36. Fourth sidewall 82 extends along sidewall 94 of the tank. First and third sidewalls 76 and 80 are distally opposite to each other along a first lateral span. Second and fourth sidewalls 78 and 82 are distally opposite to each other along a second lateral span transverse to the noted first lateral span. Water flow passage 56 from inlet 42 and pump 50 is laterally distally opposite to overflow port 86 along the noted first lateral span. Outlet 46 from lower plenum 68 is laterally distally opposite to tank sidewall 94 along the noted second lateral span.

Figure 9:
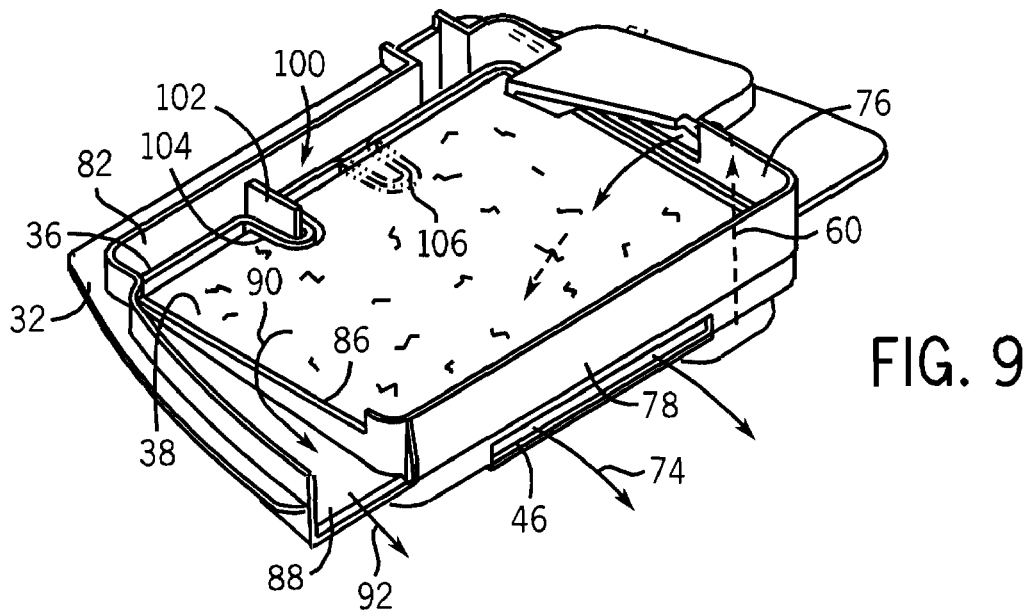
FIG. 9 is a perspective view of a portion of FIG. 4 taken from an a different angle.

Housing 22 has a filter chamber 100, FIGS. 3, 9, receiving filter element 36 therein. The filter element divides the filter chamber into filter inlet plenum 66 and filter outlet plenum 68. Filter chamber 100 and filter element 36 have respective first and second coacting keyed detents 102 and 104, FIGS. 4, 5, 7, 9 mating with each other to at least one of: a) orient and permit mounting of filter element 36 in filter chamber 100 only with first face 38 facing filter inlet plenum 66, and second face 40 facing filter outlet plenum 68; and b) permitting mounting of only an authorized filter element in filter chamber 100, namely a filter element having a coacting keyed detent to mate with coacting keyed detent 102 of filter chamber 100. Filter element 36 divides filter chamber 100 into filter inlet plenum 66 above filter element 36, and filter outlet plenum 68 below filter element 36. As above noted, replaceable filter element 36 has a height and a width spanning along an extension plane, and a thickness substantially less than such height and width and spanning perpendicularly to such extension plane, the noted thickness in the disclosed embodiment extending substantially vertically, and the noted extension plane extending substantially horizontally, wherein each of the filter inlet and outlet plenums 66 and 68 extends horizontally substantially parallel to the noted extension plane.

In a further embodiment, replaceable filter element 36 has an auxiliary detent, as shown in dashed line at 106 in FIG. 9, spaced from detent 104, and, upon reversing filter element 36, i.e. flipping it over, coacting and mating with detent 102 to permit orientation and mounting of filter element 36 in filter chamber 100 in an alternate reversed orientation position with face 38 facing downwardly toward filter outlet plenum 68, to permit reversal of filter element 36 if desired. For example, if filter element 36 is uniform throughout its vertical thickness and it does not matter which side faces up, then the inclusion of auxiliary detent 106 may be desired, to enable mounting and orientation of filter element 36 in filter chamber 100 in either of the two noted positions. On the other hand, if filter element 36 has a preferred orientation, for example if a gradient density filter is used wherein it is desired that filter face 38 face upstream, then auxiliary detent 106 is omitted, and the filter element is provided only with detent 104, to in turn permit orientation and mounting of filter element 36 in filter chamber 100 only with face 38 facing inlet plenum 66 thereabove. Detents 102 and 104 are aligned with each other and non-symmetrically disposed in offset relation in filter chamber 100 when face 38 faces filter inlet plenum 66. In the alternate reversed orientation position, detent 102 and auxiliary detent 106 are aligned with each other and non-symmetrically disposed in offset relation in filter chamber 100 when face 38 faces filter outlet plenum 68 therebelow. In one embodiment, detent 102 is a standing rib extending from housing 22, e.g. at sidewall 82, into filter chamber 100, and detent 104 is a slot in replaceable filter element 36 aligned with and receiving standing rib 102 in inserted relation when face 38 faces filter inlet plenum 66. Auxiliary detent 106, if included, is provided by a second slot in replaceable filter element 36 aligned with and receiving standing rib 102 in inserted relation when face 38 faces downwardly toward filter outlet plenum 68.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. An aquarium filter assembly comprising a housing having a mounting structure for mounting to an aquarium tank, a replaceable filter element in said housing, said filter element having a first face and an opposite second face, said housing having a filter chamber receiving said filter element therein, said filter element dividing said filter chamber into a filter inlet plenum and a filter outlet plenum, said filter chamber and said filter element respectively having first and second coacting keyed detents mating with each other to at least one of: a) orient and permit mounting of said filter element in said filter chamber only with said first face facing said filter inlet plenum, and said second face facing said filter outlet plenum; and b) permit mounting of only an authorized filter element in said filter chamber, namely a filter element having said second coacting keyed detent to mate with said first coacting keyed detent of said filter chamber.

2. The aquarium filter assembly according to claim 1 wherein said filter element divides said filter chamber into said filter inlet plenum above said filter element, and said filter outlet plenum below said filter element, said housing having an inlet receiving dirty aquarium water, and an outlet returning clean filtered water to said tank, said housing defining a flow path therethrough from upstream to downstream including a flow path portion vertically through said replaceable filter element between said faces.

3. The aquarium filter assembly according to claim 2 wherein said replaceable filter element has a height and a width spanning along an extension plane, and a thickness substantially less than said height and said width and spanning perpendicularly to said extension plane, said thickness extending substantially vertically, said extension plane extending substantially horizontally, and wherein each of said filter inlet and outlet plenums extends horizontally substantially parallel to said extension plane.

4. The aquarium filter assembly according to claim 1 wherein said replaceable filter element has an auxiliary detent spaced from said second detent and coacting and mating with said first detent to permit orientation and mounting of said replaceable filter element in said filter chamber in an alternate reversed orientation position with said first face facing said filter outlet plenum, to permit reversal of said filter element if desired.

5. The aquarium filter assembly according to claim 4 wherein:
said first and second detents are aligned with each other and non-symmetrically disposed in offset relation in said filter chamber when said first face faces said filter inlet plenum;
said first detent and said auxiliary detent are aligned with each other and non-symmetrically disposed in offset relation in said filter chamber when said first face faces said filter outlet plenum.

6. The aquarium filter assembly according to claim 5 wherein said first detent comprises a standing rib extending from said housing into said filter chamber, said second detent comprises a first slot in said replaceable filter element aligned with and receiving said standing rib in inserted relation when said first face faces said filter inlet plenum, and said auxiliary detent comprises a second slot in said replaceable filter element aligned with and receiving said standing rib in inserted relation when said first face faces said filter outlet plenum.

7. A replaceable filter element for an aquarium filter assembly having a housing having mounting structure for mounting to an aquarium tank, said replaceable filter element having a first face and an opposite second face, said housing having a filter chamber receiving said replaceable filter element therein, said replaceable filter element dividing said filter chamber into a filter inlet plenum and a filter outlet plenum, said filter chamber and said replaceable filter element respectively having first and second coacting keyed detents mating with each other to at least one of: a) orient and permit mounting of said replaceable filter element in said filter chamber only with said first face facing said filter inlet plenum, and said second face facing said filter outlet plenum; and b) permit mounting of only an authorized replaceable filter element in said filter chamber, namely a replaceable filter element having said second coacting keyed detent to mate with said first coacting keyed detent of said filter chamber.

8. The replaceable filter element according to claim 7 wherein said first and second detents are aligned with each other and non-symmetrically disposed in offset relation in said filter chamber.

9. The replaceable filter element according to claim 8 wherein said first detent comprises a standing rib extending from said housing into said filter chamber, and said second detent comprises an aligned slot in said replaceable filter element receiving said standing rib in inserted relation.

10. The replaceable filter element according to claim 7 wherein said replaceable filter element has an auxiliary detent spaced from said second detent and coacting and mating with said first detent to permit orientation and mounting of said replaceable filter element in said filter chamber in an alternate reversed orientation position with said first face facing said filter outlet plenum, to permit reversal of orientation of said filter element if desired.

11. The replaceable filter element according to claim 10 wherein:
  said first and second detents are aligned with each other and non-symmetrically disposed in offset relation in said filter chamber when said first face faces said filter inlet plenum;
  said first detent and said auxiliary detent are aligned with each other and non-symmetrically disposed in offset relation in said filter chamber when said first face faces said filter outlet plenum.

12. The replaceable filter element according to claim 11 wherein said first detent comprises a standing rib extending from said housing into said filter chamber, said second detent comprises a first slot in said replaceable filter element aligned with and receiving said standing rib in inserted relation when said first face faces said filter inlet plenum, and said auxiliary detent comprises a second slot in said replaceable filter element aligned with and receiving said standing rib in inserted relation when said first face faces said filter outlet plenum.

* * * * *